US009992027B1

(12) United States Patent
Rubin et al.

(10) Patent No.: US 9,992,027 B1
(45) Date of Patent: Jun. 5, 2018

(54) SIGNING KEY LOG MANAGEMENT

(71) Applicant: Amazon Technologies, Inc., Reno, NV (US)

(72) Inventors: Gregory Alan Rubin, Seattle, WA (US); Gregory Branchek Roth, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 97 days.

(21) Appl. No.: 14/853,605

(22) Filed: Sep. 14, 2015

(51) Int. Cl.
H04L 29/06 (2006.01)
H04L 9/32 (2006.01)
H04L 9/08 (2006.01)

(52) U.S. Cl.
CPC .......... *H04L 9/3247* (2013.01); *H04L 9/0819* (2013.01); *H04L 2209/24* (2013.01); *H04L 2209/72* (2013.01)

(58) Field of Classification Search
USPC .......................................................... 713/176
See application file for complete search history.

(56) References Cited

U.S. PATENT DOCUMENTS

| 8,352,725 | B1* | 1/2013 | O'Toole, Jr. ............ H04L 63/20 713/151 |
| 8,707,446 | B2* | 4/2014 | Roy-Chowdhury ...... G06F 8/71 726/26 |
| 9,225,746 | B2* | 12/2015 | Osborne ............... H04L 9/3297 |
| 2002/0150241 | A1* | 10/2002 | Scheidt ................... H04L 9/321 380/44 |
| 2004/0093499 | A1* | 5/2004 | Arditi ................... H04L 9/3247 713/176 |
| 2004/0267668 | A1* | 12/2004 | Aissi ....................... G06F 21/60 705/50 |
| 2005/0076198 | A1* | 4/2005 | Skomra ................... H04L 9/321 713/156 |
| 2005/0193043 | A1* | 9/2005 | Hoover ................. G06F 19/328 |
| 2005/0235153 | A1* | 10/2005 | Ikeda .................... H04L 63/062 713/176 |
| 2006/0129817 | A1* | 6/2006 | Borneman .............. G06F 21/41 713/170 |
| 2009/0064193 | A1* | 3/2009 | Chijiiwa ............. H04L 41/0622 719/318 |
| 2011/0055559 | A1* | 3/2011 | Li ....................... G06F 21/6218 713/165 |
| 2012/0179646 | A1* | 7/2012 | Hinton .............. G06F 17/30557 707/607 |

(Continued)

*Primary Examiner* — Harris C Wang
(74) *Attorney, Agent, or Firm* — Hogan Lovells US LLP

(57) ABSTRACT

Cryptographic keys can include logging properties that enable those keys to be used only if the properties can be enforced by the cryptographic system requested to perform one or more actions using the keys. The logging property can specify how to log use of a respective key. A key can also include a mutability property for specifying whether the logging property can be changed, and if so under what circumstances or in which way(s). The ability to specify and automatically enforce logging can be important for environments where audit logs are essential. These can include, for example, public certificate authorities that must provide accurate and complete audit trails. In cases where the data is not to be provided outside a determined secure environment, the key can be generated with a property indicating not to log any of the usage.

12 Claims, 5 Drawing Sheets

(56) References Cited

U.S. PATENT DOCUMENTS

| | | | |
|---|---|---|---|
| 2012/0204032 A1* | 8/2012 | Wilkins | H04L 9/006 |
| | | | 713/170 |
| 2012/0210436 A1* | 8/2012 | Rouse | G06F 21/125 |
| | | | 726/26 |
| 2014/0119540 A1* | 5/2014 | Pearson | H04L 9/0825 |
| | | | 380/44 |
| 2014/0359375 A1* | 12/2014 | Longobardi | G06F 11/1471 |
| | | | 714/45 |
| 2015/0172317 A1* | 6/2015 | Osborne | H04L 9/3297 |
| | | | 713/178 |
| 2015/0304736 A1* | 10/2015 | Lal | G06F 21/10 |
| | | | 380/210 |

\* cited by examiner

SIGNING KEY LOG MANAGEMENT

BACKGROUND

Users are increasingly performing tasks using remote computing resources, often referred to as part of "the cloud." This has many advantages, as users do not have to purchase and maintain dedicated hardware and software, and instead can pay for only those resources that are needed at any given time, where those resources typically will be managed by a resource or "cloud" provider. It will often be the case that a user will want one or more cloud resources to perform actions on behalf of the user. In order to provide for the authenticity of an instruction, message, or document involved in the action, a digital signature is often used. If the recipient can verify that the digital signature was generated using a key for a particular sender, then the recipient can be confident that the content originated from the sender. Keys can be obtained from many sources, such as certificate authorities that certify the ownership of a public key by the named owner of the key. Problems arise, however, in the fact that certain environments require logging of signing activities for a key while other environments need to avoid information appearing in such a log, and conventional systems do not provide such flexibility built into a cryptographic system.

BRIEF DESCRIPTION OF THE DRAWINGS

Various embodiments in accordance with the present disclosure will be described with reference to the drawings, in which.

DETAILED DESCRIPTION

Figure 1:
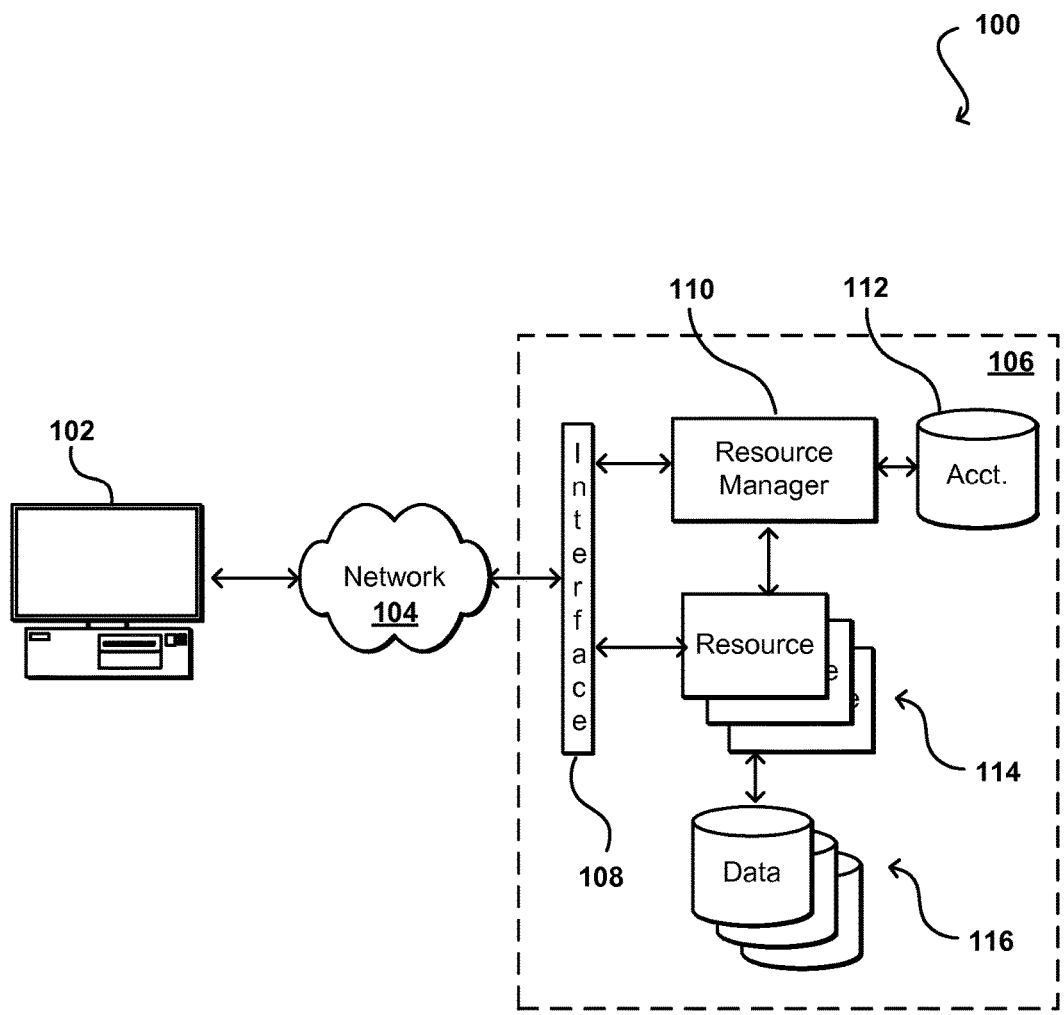
FIG. 1 illustrates an example environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the management of logging for use of cryptographic keys, or other such tokens, in an electronic environment. In particular, various approaches provide for logging properties to be specified for cryptographic keys, such as by setting flags or values in the metadata of the keys. The properties can include, for example, one property as to whether logging is to be performed, as well as when logging is to be performed or for which types of use. The properties can also include a mutability property, which can specify whether the logging property of a key can be changed, and in some embodiments can specify the functions, types of data, or other aspects for which it can be changed. The cryptographic system can be configured such that a key cannot be issued, accessed, or otherwise used unless the specified logging property can be enforced.

The ability to specify and automatically enforce logging can be important for environments where audit logs are essential. These can include, for example, public certificate authorities that must provide accurate and complete audit trails to ensure that the certificates issued and signed by those authorities can be trusted to belong to the indicated owners. It is often the case, however, that signatures or certificates include some of the underlying data, such as the raw data, or a function, hash, or digest of the data. In cases where it is undesirable (or forbidden, etc.) to provide such data outside a determined environment with minimum or specified security, for example, it may be undesirable to disclose such data in any form. For data stored in private environments, the logging property of the key can be set to not log usage, such that the data will not be stored in any form in a lower security audit log. The signing keys can be used to prevent tampering of the data or to provide for authenticity of the data, but use of the data within the environment itself would not be logged in order to prevent including sensitive data in the audit log. For entities that also function as their own certificate authorities, those entities may want to have a verifiable log of all signed certificates, without having the sensitive data stored in the audit log and susceptible to leaking or unauthorized access. In such cases a key can be created with a property that a specific function of the signed data (such as SHA256) is logged for audit purposes, without storing any of the other underlying data.

Various other such functions can be used as well within the scope of the various embodiments as would be apparent to one of ordinary skill in the art in light of the teachings and suggestions contained herein.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes. The same or a different authentication method may be used for other tasks, such as for the use of cryptographic keys. In some embodiments a key management system or service can be used to authenticate users and manage keys on behalf of those users. A key and/or certificate management service can maintain an inventory of all keys certificates issued as well as the user to which they were issued. Some regulations require stringent security and management of cryptographic keys which must be subject to audit or other such review. For cryptographic key pairs where both public and private verification parameters are generated, a user may be granted access to a public key while private keys are kept secure within the management service. A key management service can manage various security aspects, as may include authentication of users, generation of the keys, secure key exchange, and key management, among other such tasks.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

In a cryptographic environment, such as the cloud-based, multi-tenant environment described with respect to FIG. 1, a user may want to have data, messages, or other content signed with a key in order to provide a level of security, and verifiability, to the data. A signing key can be used advantageously even over data that is not exposed outside the environment in order to prevent tampering with the data and/or to provide authenticity of the data or a source of the data. This private data, which can potentially include secret or confidential information, should be stored with at least a minimum level of security. While the signing of data using a key is typically logged for audit purposes, the logging process often involves storing some of the signed data in the log. Since logs are often stored at a lower level of security than the data itself, so that the logs can be monitored and audited, for example, such logging could result in the potential exposure of the data through the lower security level storage. Logging the signed data in such a situation could be considered an unacceptable leak of sensitive data. Thus, it would be desired in such a situation for logging to not be performed for operations involving the key.

There are situations, however, where logging of operations using a key may be required. For example, a trusted third party such as a certificate authority can be used to certify ownership of the key used for a digital signature. Because a certificate authority is a third party that needs to be trusted and reliable for all its users, the certificate authority will generally need to demonstrate reliable records of every certificate (and thus message) that is signed by the certificate authority. In such a situation, it can be desirable to log every action taken with a certificate, which can involve logging all messages, data, or other content signed by the certificate authority.

In order to satisfy the needs in both situations, approaches in accordance with various embodiments can provide for the creation and management of cryptographic keys that have a property (or properties) that specifies whether all data signed by that key, or a function of that key, is to be output to a usage or audit log, or other such repository. This property can be specified at creation of the key, and in some embodiments can be modified throughout the lifecycle of the respective key. In some embodiments a separate mutability property can be specified for the key, which indicates whether or not the logging property is mutable, or can be changed over the course of the lifetime of the key. In some embodiments, as discussed elsewhere herein, there may be other values specified, such that a key may be changed from immutable to mutable, but once changed to mutable cannot be changed back to immutable, among other such options. The ability to set the logging property and change the logging, where allowable, provides flexibility when using the keys for different purposes, which can have different confidentiality requirements. Further, such approaches can be used for other credentials as well, such as symmetric message authentication codes among other such options.

Referring back to the situation 100 of FIG. 1, a user having private, internal data stored in the resource environment and accessible only within the environment may want information about each time their key was used, and the identity of the entity causing the key to be used. The user may not care about the information that was signed in the environment, however, and may not want the information to be available from within the logs. In such an environment, the user might specify that a logging property of the key is set to a "no logging" or other such value, whereby information about someone accessing a key might be stored but no logging of the actual activity or data with which the key was used will be stored. The internal data may relate to social security numbers, performance reviews, or other such sensitive data that should not be stored in places other than specified locations with specified security levels. The data still needs to be signed for authenticity and chain of custody, for example, but the content that is signed should remain confidential.

When using a public certificate authority, however, it is necessary for the authority to provide the ability to audit the cryptographic operations performed with a specific key. The certificate authority can store information about public keys and their owners, along with certificates issued for those keys. This can include not only auditable data about who access a key and when, but also information about any operation performed with that key. Accordingly, a logging property of the key can be set to a "yes," "log," or other such value indicating that data for operations performed using the key should always be logged for audit or other such purposes. The key can also have a mutability property set to "immutable" such that the logging is always performed for the key. The ability to change the key to "no logging" and then switch back to "logging" would cause faith to be lost in the logs for the key, because not all data may have been written to the logs, etc. It is necessary in some applications to be able to produce a record of a situation where a certificate authority was compelled, hacked, or otherwise caused to issue a certificate that the authority would not have otherwise issued, and be able to determine what the certificate was used for. The audit log in such a situation can provide evidence of the exact binary that was signed using the certificate.

An advantage to such an implementation over other approaches is that the properties enable the functionality to be provided as part of an overall cryptographic system (i.e., a hardware security module or general purpose computer(s) executing cryptographic code), instead of a policy that may not be enforced by a particular system. The properties specify how logging of activities should be performed, as well as whether the requirement to log (or not log) certain information can be changed over the course of the lifecycle. A key management service could implement this functionality by refusing to provide a signature to a user unless a log with the appropriate fields is also generated (or not generated) as specified by the key properties. Such functionality could also be implemented by a hardware security module or other such component of the environment.

As mentioned, the logging property can be mutable in at least some embodiments through setting of the appropriate key property. In some instances this can be allowed only in one direction, such as going from immutable (or partially mutable) to mutable but not back in the other direction, as discussed previously. In some instances, however, it might be desirable to allow full mutability for a key. For example, it might be desirable to perform no logging for a key for a number of different operations. At some point it might be desirable to log data for a particular record with which the key is being used. Accordingly, the log property can be changed as long as is appropriate for logging data for that particular record, after which the property can be changed back to not logging.

In some embodiments the logs can also be monitored or audited to attempt to detect omissions or deletions. For example, there could be a series of certificates signed and corresponding data logged. If one of the log entries in the series is missing, that missing entry can be detected and written to another log or otherwise used to provide information about the omission. An audit log should function as an audit trail, providing a full chronological record (at least from a security perspective) of activities, in sequence, that have affected data, content, an object, a component, an operation, an event or any other such element. The log is typically generated in response to an access, transaction, modification, communication, or other such action. An entity such as a logging manager can operate in a "privileged" mode, or in a closed system, for example, wherein the logging manager has visibility into all actions and events that occur with respect to specific data or elements, and wherein such operation cannot be modified by an unauthorized user. An audit system should be able to utilize the log to determine a chronological record of system activities in order to reconstruct and examine the sequence of events, as well as the effect(s) of each of those events.

Figure 2:
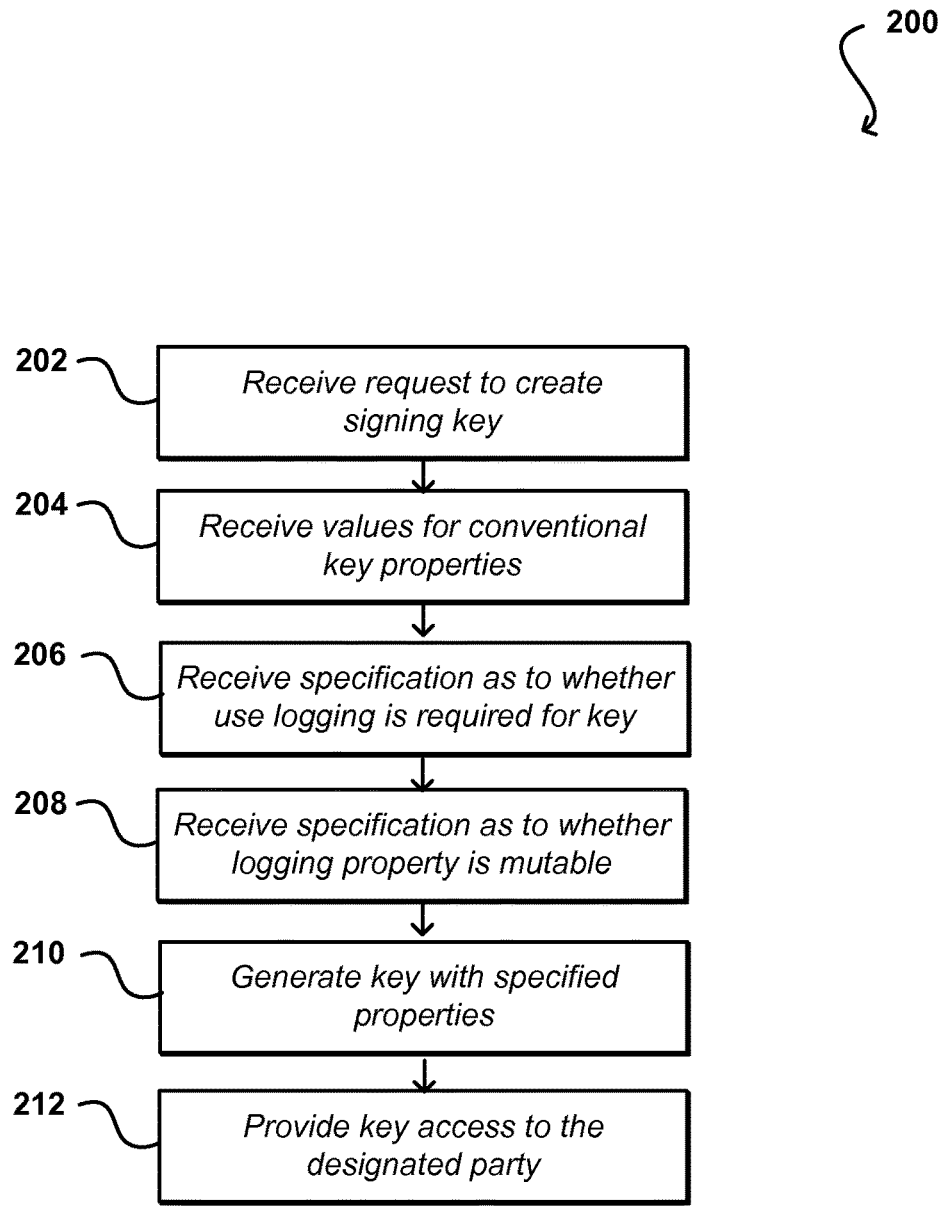
FIG. 2 illustrates an example process for generating a signing key with logging properties that can be utilized in accordance with various embodiments.

FIG. 2 illustrates an example process 200 for creating a key that can be used in accordance with various embodiments. It should be understood that for this and other processes discussed herein that additional, fewer, or alternative steps can be performed in similar or alternative steps, or in parallel, within the scope of the various embodiments unless otherwise stated. In this example, a request is received 202 to create a signing key of a specified type. These types can include, for example, RSA 2048, ECDSA (elliptical curve digital signature algorithm), AES-256 (an advanced encryption standard cipher), or HMAC with SHA-256, among others. Specification of values for one or more conventional key properties can be received 204, where those properties can specify algorithms or uses that are permitted, etc. A specification can also be received 206 as to whether logging is required for the key. As mentioned, this can include a requirement to always log activity for the key, never log activity for the key, or log activity for certain functions, uses, or other access of the key. If logging is to be performed for one or more functions, the function(s) can be identified in the property data or in data associated with the key property, among other such options. The logged data then can include some function of the input, or the function of a hash of a portion of the input, etc. Signatures typically are not performed on the data directly, but more often on a hash or function of the data or other portion or version of the data. This is done for various reasons, such as to avoid exposing the raw data as well as to comply with limits that the signed data cannot be longer than (or even a significant portion of the length of) the key, etc. In some embodiments the signature is over a hash or other function of at least a portion of the data, as well as some amount of metadata relating to the data or the owner, etc.

Along with the logging property value, another specification can be received 208 as to whether the logging property is mutable, immutable, or partially mutable (i.e., mutable in certain ways or for certain functions) as discussed herein. For immutable keys the logging property cannot be changed, while for mutable keys the logging property may be able to be changed at any time by an authorized user or other appropriate party. For a partially mutable key, certain changes may be made, such as to be able to go from immutable to mutable but not back, or to only be able to change for certain properties or uses, etc. From these inputs, the key can be generated 210 and access provided 212 to the designated party. The key (or other token or credential) can be include any appropriate key data, as may include a random alphanumeric string, a string generated based on information about the owner, a string generated based on information about an application requesting the key, a password, or a key string specified by the user, among other such options. The key can be of a specified length and generated using a specified algorithm in at least some embodiments.

Figure 3:
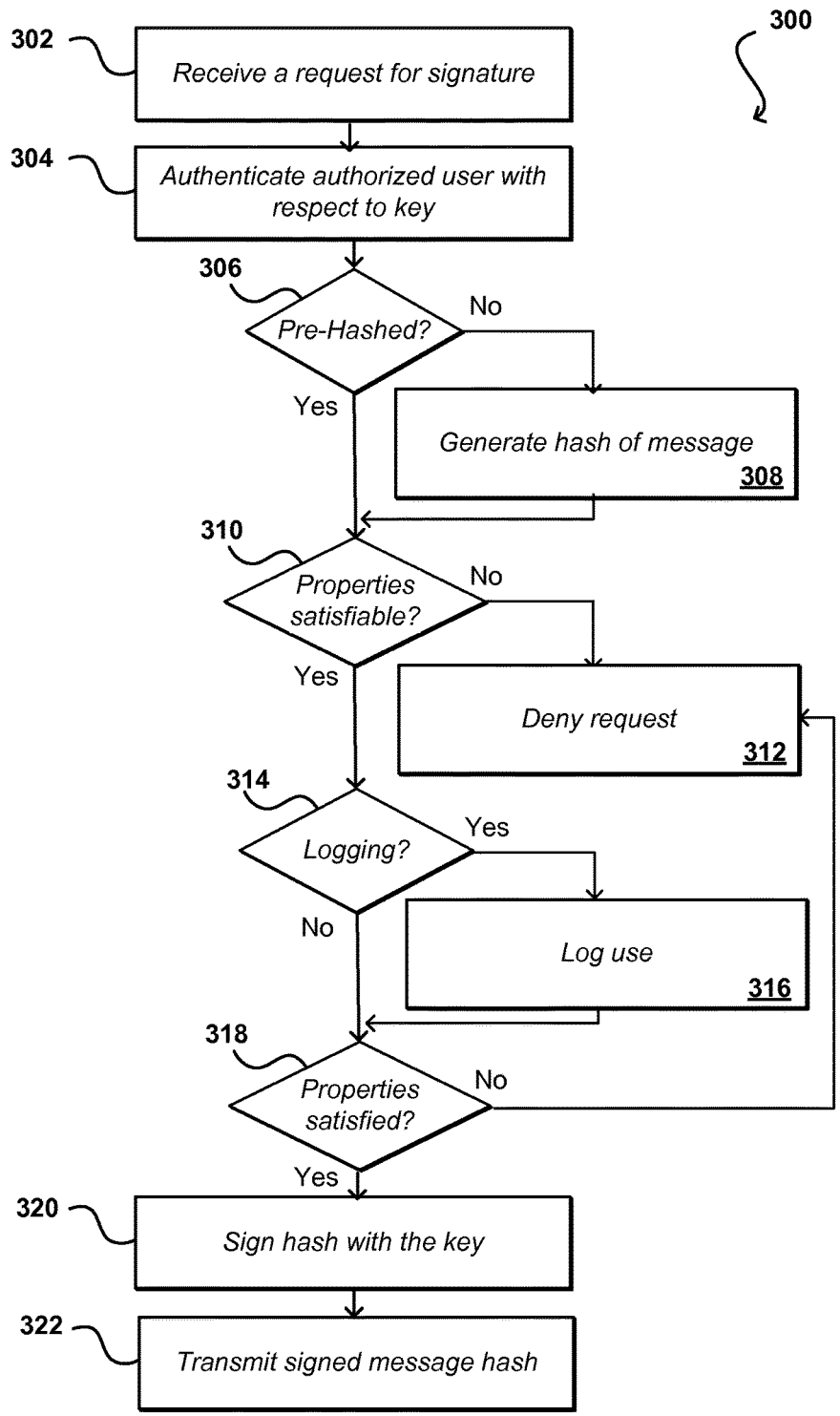
FIG. 3 illustrates an example process for signing a request with a key when the system is able to enforce logging properties of a key that can be utilized in accordance with various embodiments.

FIG. 3 illustrates an example process 300 for signing data using a key such as that generated as described with respect to FIG. 3. In this example, a request to sign data is received 302. The request can be any appropriate request, such as a call to an application programming interface (API) or other such request. This can include, for example, a certificate signing request (CSR) being received to a certificate authority, where the CSR is requested to sign a hash of the message (or other function of the data for the message) using a specified algorithm. A user associated with the request can be authenticated 304 and determined to be authorized with respect to the key. A determination can be made 306 as to whether the data for the request is in the form of a full message or a hash of a message, for example. As mentioned, it can be advantageous in some embodiments to send a pre-computed hash of data instead of the raw data in order to conserve bandwidth, memory, or other such resources, as well as to protect the contents of the message. If the data is a full message, a hash of the message can be generated 308. This can be any appropriate hash determined using any appropriate hashing algorithm or approach as discussed and suggested herein. In some embodiments the entire message can be signed, although this embodiment utilizes hashes at least for reasons discussed herein. A determination can also be made 310 as to whether the properties of the key can be satisfied by the system. This can include, for example, whether logging of the use of the key can be enforced in the system if, and in any way, required by the properties of the key. If not, the request can be denied 312. If logging is to be performed 314, the use of the key can be logged 316 or otherwise stored for audit or other such purposes. This can include, for example, writing information for the use of the key to encrypt the message to an audit log or other appropriate location. If the properties are determined to have been satisfied 318, such as where the data for the use was properly logged and verified, the hash can be signed 320 with the appropriate key. If the properties were not able to be satisfied, the hash is not signed and the request denied 312. As mentioned, in some embodiments the properties might specify certain uses to be logged, and the data is written to the log only if the use satisfies one of the listed logging uses. Assuming all necessary logging and other actions are satisfied, or capable of being satisfied, the signed message hash can be transmitted 322 in response to the request. The sender can maintain a copy of the original message for purposes of verifying the signature.

Figure 4:
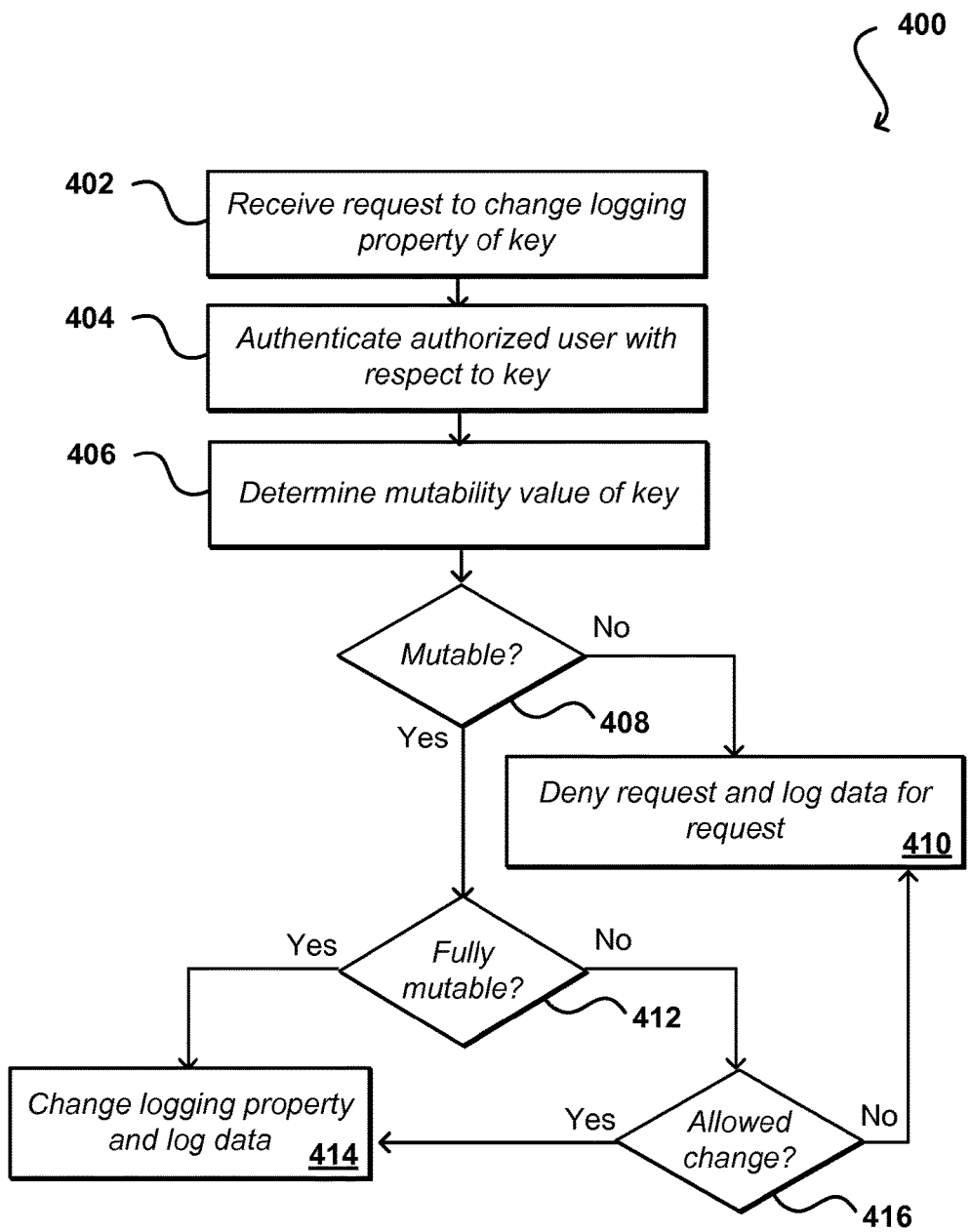
FIG. 4 illustrates an example process for changing the logging property of a key that can be utilized in accordance with various embodiments

As mentioned, an owner of a key (or other authorized party) might want to change the logging property of a key for one of a number of reasons. As mentioned, some applications or use cases require logging while others do not, such that the owner may have set the property on the key accordingly. If the use or application changes, or if the sensitivity of the underlying data changes, for example, it may be desirable to change the logging property of the key. It can be important in many situations, however, to ensure that the property cannot be changed by unauthorized entities or in situations where the logging is a requirement. FIG. 4 illustrates an example process 400 for changing the logging property of a key that can be utilized in accordance with various embodiments. In this example, a request to change the logging property of a specified key is received 402, where the request includes (or is associated with) information allegedly usable to indicate the authorization of a sender of the message to make such a change. This can include one or more credentials, keys, passwords, user identifiers, account numbers, or other such data. Based at least in part upon information received or associated with the request, a user can be authenticated 404 and determined to be authorized with respect to the key. In some embodiments this can be performed before the mutability of the key property is checked, or concurrently. A mutability value of the key is determined 405, in many embodiments by analyzing a mutability property set in the metadata of the specified key. If it is determined 408 that the logging property of the key is not mutable, then the request to change the logging property can be denied 410 and data for the request can be logged in at least some embodiments.

If the mutability property of the key indicates that the key is at least semi-mutable, or mutable under certain conditions or in certain ways, a determination can be made 412 as to the mutability of the logging property of the key. This can include determining 412 whether the logging property is fully mutable (although this can be performed in the same step as the mutability determination in step 408 in some embodiments). If the property is fully mutable, then the logging property of the key can be changed 414 as indicated by the request, as long as the change meets with other applicable policies or rules, etc. If the logging property is not fully mutable, a determination can be made 416 as to whether the requested change falls within the allowable changes specified by the property and/or metadata of the key. As mentioned, this can include the ability to change for certain functions or data, among other such options. In some embodiments this can only allow a change in a specified direction, such as a change that requires more logging than the previous setting. If the change is not allowed, the request can be denied 410. If the change is allowable, the logging property can be changed as specified in the request. The change can be logged, depending at least in part upon the new change setting specifying logging for such use.

Figure 5:
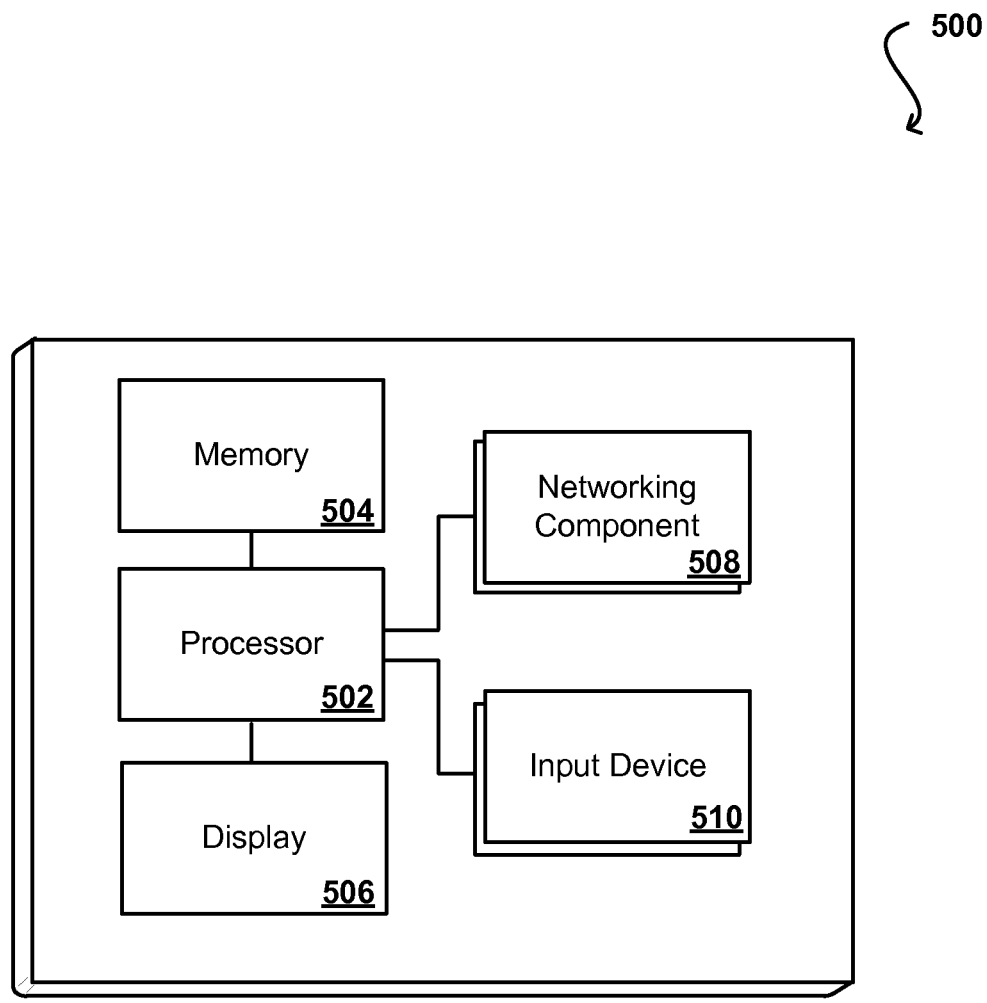
FIG. 5 illustrates example components of a computing device that can be used to implement aspects of various embodiments.

FIG. 5 illustrates a set of basic components of an example computing device 700 that can be utilized to implement aspects of the various embodiments. In this example, the device includes at least one processor 502 for executing instructions that can be stored in a memory device or element 504. As would be apparent to one of ordinary skill in the art, the device can include many types of memory, data storage or computer-readable media, such as a first data storage for program instructions for execution by the at least one processor 702, the same or separate storage can be used for images or data, a removable memory can be available for sharing information with other devices, and any number of communication approaches can be available for sharing with other devices. The device may include at least one type of display element 506, such as a touch screen, electronic ink (e-ink), organic light emitting diode (OLED) or liquid crystal display (LCD), although devices such as servers might convey information via other means, such as through a system of lights and data transmissions. The device typically will include one or more networking components 508, such as a port, network interface card, or wireless transceiver that enables communication over at least one network. The device can include at least one input device 510 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device.

Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one processor; and
   memory including instructions that, when executed by the at least one processor, cause the system to:
   receive a first request to generate a cryptographic key, the first request associated with a user and indicating a type of logging to be performed for use of the cryptographic key;
   authenticate an identity of the user;
   generate the cryptographic key, the cryptographic key including private parameters for a cryptographic signing function, information indicating the identity of the user, and metadata specifying a logging value and a mutability value, the logging value specifying the type of logging, the mutability value specifying how the logging value is changeable over a lifecycle of the cryptographic key;
   provide the user with access to the cryptographic key;
   receive a second request to sign data using the cryptographic key;
   determine the logging value of the cryptographic key;
   determine that the type of logging specified by the logging value is able to be enforced by the system;
   sign the data using the cryptographic key;
   perform the type of logging specified by the logging value for signing the data; and
   transmit the signed data to a destination specified by the second request.

2. The system of claim 1, wherein the instructions when executed further cause the system to perform the type of logging by:
   writing, to an audit log and in response to the logging value indicating to always log use data, the information about the signing including at least one of the data or a transformation of the data; and
   writing, to the audit log, at most information about the signing without any of the data of the message in response to the logging value indicating to never log data signed with the cryptographic key.

3. The system of claim 1, wherein the instructions when executed further cause the system to:
   receive a request to modify the logging value of the cryptographic key;
   modify the logging value in response to the mutability value enabling the logging value to be modified and an identity of a user associated with the request is authenticated; and
   deny the request in response to the mutability value indicating that the logging value is unable to be modified.

4. The system of claim 3, wherein the instructions when executed further cause the system to:
   generate a corresponding set of public verification parameters for a second cryptographic key; and
   provide the user with access to the set of public verification parameters.

5. A method, comprising:
   receiving a first request to generate a cryptographic key, the first request associated with a user and indicating a type of logging to be performed for use of the cryptographic key;
   authenticating an identity of the user;
   generating the cryptographic key, the cryptographic key including private parameters for a cryptographic signing function, information indicating the identity of the user, and metadata specifying a logging value and a mutability value, the logging value specifying the type of logging, the mutability value specifying how the logging value is changeable over a lifecycle of the cryptographic key;
   providing the user with access to the cryptographic key;
   receiving a second request to sign data using the cryptographic key;
   determining the logging value of the cryptographic key;
   determining that the type of logging specified by the logging value is able to be enforced by the system;
   signing the data using the cryptographic key;
   performing the type of logging specified by the logging value for signing the data; and
   transmitting the signed data to a destination specified by the second request.

6. The method of claim 5, wherein the type of logging is performed by:
   writing, to an audit log and in response to the logging value indicating to always log use data, the information about the signing including at least one of the data or a transformation of the data; and
   writing, to the audit log, at most information about the signing without any of the data of the message in response to the logging value indicating to never log data signed with the cryptographic key.

7. The method of claim 5, further comprising:
   receiving a request to modify the logging value of the cryptographic key;
   modifying the logging value in response to the mutability value enabling the logging value to be modified and an identity of a user associated with the request is authenticated; and
   denying the request in response to the mutability value indicating that the logging value is unable to be modified.

8. The method of claim 7, further comprising:
   generating a corresponding set of public verification parameters for a second cryptographic key; and
   providing the user with access to the set of public verification parameters.

9. Non-transitory computer-readable storage media having stored therein instructions which, when executed by at least one computing device, cause the at least one computing device to:
   receive a first request to generate a cryptographic key, the first request associated with a user and indicating a type of logging to be performed for use of the cryptographic key;
   authenticate an identity of the user;
   generate the cryptographic key, the cryptographic key including private parameters for a cryptographic signing function, information indicating the identity of the user, and metadata specifying a logging value and a mutability value, the logging value specifying the type of logging, the mutability value specifying how the logging value is changeable over a lifecycle of the cryptographic key;
   provide the user with access to the cryptographic key;

receive a second request to sign data using the cryptographic key;
determine the logging value of the cryptographic key;
determine that the type of logging specified by the logging value is able to be enforced by the system;
sign the data using the cryptographic key;
perform the type of logging specified by the logging value for signing the data; and
transmit the signed data to a destination specified by the second request.

10. The non-transitory computer-readable storage media of claim 9, wherein the instructions when executed further cause the at least one computing device to perform the type of logging by:
writing, to an audit log and in response to the logging value indicating to always log use data, the information about the signing including at least one of the data or a transformation of the data; and
writing, to the audit log, at most information about the signing without any of the data of the message in response to the logging value indicating to never log data signed with the cryptographic key.

11. The non-transitory computer-readable storage media of claim 9, wherein the instructions when executed further cause the at least one computing device to:
receive a request to modify the logging value of the cryptographic key;
modify the logging value in response to the mutability value enabling the logging value to be modified and an identity of a user associated with the request is authenticated; and
deny the request in response to the mutability value indicating that the logging value is unable to be modified.

12. The non-transitory computer-readable storage media of claim 11, wherein the instructions when executed further cause the at least one computing device to:
generate a corresponding set of public verification parameters for a second cryptographic key; and
provide the user with access to the set of public verification parameters.

* * * * *